Nov. 17, 1925.                                          1,561,983
                    H. W. KELLER ET AL
           APPARATUS FOR CASTING METALLIC VEHICLE WHEELS
                 Filed Oct. 9, 1924        2 Sheets-Sheet 1
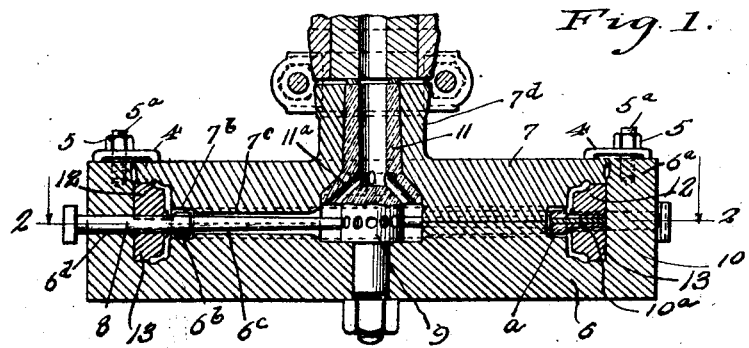
Inventor
Harry W. Keller
Albert T. Heller Nov. 17, 1925.
H. W. KELLER ET AL
1,561,983
APPARATUS FOR CASTING METALLIC VEHICLE WHEELS
Filed Oct. 9, 1924   2 Sheets-Sheet 2
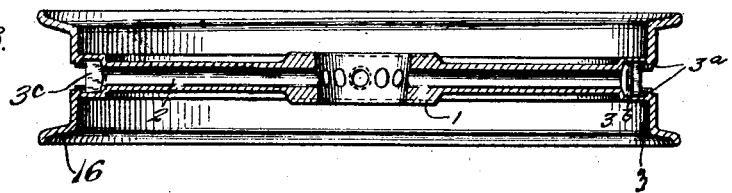
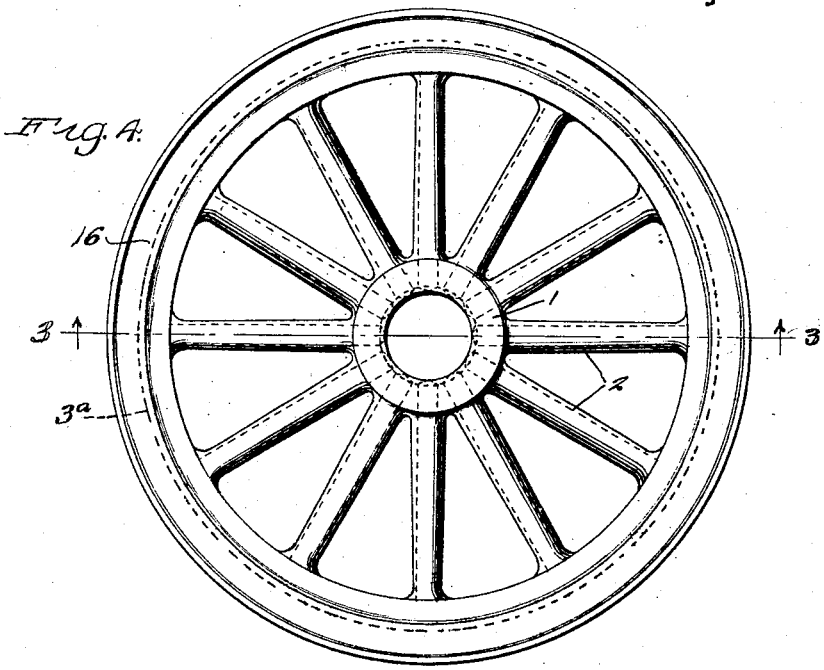
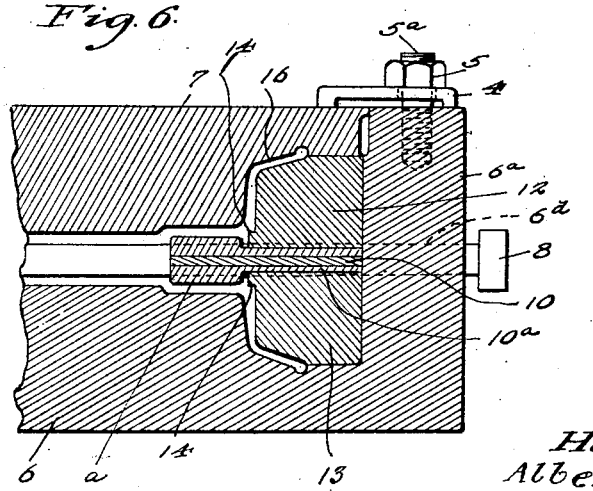
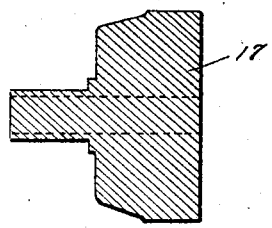
Inventor
Harry W. Keller
Albert T. Keller
By Spear, Middleton, Donaldson & Spear
Attorney Patented Nov. 17, 1925.

1,561,983

UNITED STATES PATENT OFFICE.

HARRY W. KELLER, OF PITTSBURGH, AND ALBERT T. KELLER, OF BETHLEHEM, PENNSYLVANIA.

APPARATUS FOR CASTING METALLIC VEHICLE WHEELS.

Application filed October 9, 1924. Serial No. 742,628.

*To all whom it may concern:*

Be it known that we, HARRY W. KELLER and ALBERT T. KELLER, citizens of the United States, and residents of Pittsburgh and Bethlehem, in the counties of Allegheny and Northampton, respectively, in the State of Pennsylvania, have invented certain new and useful Improvements in Apparatus for Casting Metallic Vehicle Wheels, of which the following is a specification.

Our present invention relates to an improvement on the apparatus for molding metallic vehicle wheels, as disclosed in our application No. 573,206, and the invention aims to provide apparatus by the means of which a metallic wheel having integral hollow hub, spoke and felly members having a tire receiving rim thereon, may be economically and expeditiously manufactured without requiring the use of destructible cores such as sand cores, for example.

Our invention will be explained by aid of the accompanying drawings, in which:—

Figure 1 is a sectional elevation of a mold for casting one embodiment of the invention.

Fig. 2 is a plan view of the mold of Fig. 1, partly in section.

Fig. 3 is a sectional elevation of a cast wheel.

Fig. 4 is a plan view of the device of Fig. 3.

Fig. 5 is a fragmentary sectional view of the mating parts of the mold.

Fig. 6 is a view similar to Fig. 5, showing a modified form.

Fig. 7 is a detail of one of the mold elements.

Fig. 8 is a perspective detail of the aperture-projecting band.

Referring by reference characters to these drawings, we will first describe the wheel which our apparatus is designed to produce and which is shown in Figs. 3 and 4. This is shown as comprising a hub 1, spokes 2 and a felly 3, all formed by casting into a single integral structure. The spokes 2 are formed hollow, as shown, and the bores of these spokes are continued through the hub member 1, thus imparting lightness and avoiding the use of unnecessary metal.

The felly is also made hollow, being specifically of channel shape with the outer peripheral edges of the side walls of the channel provided with inwardly facing flanges, as indicated at 3ª, and outwardly turned flanges 16 adapted to receive the vehicle tire and constituting the usual tire rim.

The apparatus for forming or casting the wheel above described comprises a mold such as shown in Figs. 1 and 2, in which 6 and 7 represent complementary mold sections, each having a mold cavity, or cavities shaped to conform approximately to one-half of the wheel to be cast therein. Preferably the mold member 6 has an annular flange or portion 6ª which overlaps the outer periphery of the mold member 7, which latter is held in place by clamps 4 secured by nuts 5 on the bolts 5ª tapped into the said member 6ª. The parting line of the mold formed by the members 6 and 7 preferably coincides with the center line of the spokes. Located centrally within the hub forming cavity of the mold, is a core plug 9 which forms the bore of the hub. The mold sections 6 and 7 are provided with annular rebates or grooves 6ᵇ and 7ᵇ which form the mating cavities in which the felly is cast, the mating spoke forming cavities 6ᶜ and 7ᶜ radiating from the mating hub cavities to the felly forming cavities and corresponding in number to the number of spokes which it is desired that the wheel shall have.

The mold member 6 is provided with a plurality of radial openings or holes 6ᵈ in line with the spoke cavities, through which are passed the spoke cores 8, which extend inwardly through the hub cavity and have their inner ends seated in peripheral recesses in the hub core 9, which hub core forms the bore of the hub, the spoke cores being capable of being readily inserted in the groove by a radial or lengthwise movement. In order to form the felly in the shape shown without necessitating the use of a destructible core, we provide collapsible segmental cores which extend between adjacent spoke cores and which comprise central flat arc-shaped members 10, and are interposed between side members 10ª which have arc-shaped enlargements *a*. When the three sections forming a felly core piece are assembled, they form a core piece which, roughly speaking, is of T-shape in cross section, the head of the T serving to shape the interior walls of the hollow portion of the felly, and the shank of the T defining the inner edges of the flanges 3ª. Abutting the shank of the T are segmental rings 12 and 13 which act as core pieces to shape the inner surface of the tire receiving rim, the outside of the rim being shaped by a rim forming cavity in the mold parts 7 and 6. The segmental parts of the rings 12 and 13 are preferably semi-circular in shape to facilitate removal when the mold pieces are dismantled.

Each ring section 12 and 13 is provided with a shoulder 14 which when the wheel is cast, forms a groove lying centrally of the tire receiving rim. Within this groove we propose to place a band or sheet of material 18, which will prevent the tire or pneumatic tube used therewith from entering the apertures through which the felly cores are withdrawn.

It may be desirable to use a felly core, as at 15, in Fig. 5 which comprises six segments, doing away with the individual parts 10 and 10ª and the flange 3ª on the wheel felly formed by using the parts 10 and 10ª. In this modification the core 15 is of uniform diameter throughout. The rings 12 and 13 in this form retain substantially their structure as above described.

It is entirely possible that the rings 12 and 13, and the felly cores may be made integral as at 17. In this case it would be necessary to form the core 17 in segments corresponding say to one-sixth of a circle. Obviously each form of core used for the felly must be provided with apertures for the spoke cores 8 and in the last modification these apertures would be located in the core 17.

The molten metal may be supplied to the mold in any suitable manner, as for instance, by providing the mold with a neck 7ᵈ within which is provided a refractory lining 11, the central bore or passage of which connects by branch ports 11ª with the hub forming cavity. After the wheel has been cast by supplying the mold with molten metal from any suitable source and in any desirable manner, the spoke cores may be readily withdrawn, and upon separating the mold members the felly forming cores may be readily withdrawn by first removing the central core sections 10 whereafter the sections 10ª may be individually withdrawn, it being understood that the flange or enlarged portions a of the sections are of such size as to permit their passage through the space between the inturned flanges 3ª of the felly. In one of the forms shown in Fig. 1, the parts 7, 10, 10ª, 12 and 13 are lifted out of the mating parts 6 after which 12 and 13 are removed from the cast wheel followed by parts 10 and 10ª. In the form shown in Fig. 5, the parts 12, 13 and 15 may be removed with the cast wheel after the removal of spoke core 8 and then separated, or, if integral, remaining intact as in Fig. 7.

By the use of molding apparatus such as above described, we are enabled to construct a one-piece wheel, having hollow hub, spoke and channel shaped felly members without the use of any sand cores or cores of a nature which must be destroyed in order to remove them from the mold. Such a wheel may be made of approximately the same dimensions as the wooden wheels customarily used on motor vehicles, and can be fitted out with the same attachments, such as hub centers, brake drums and the like.

The mold and core parts hereinbefore described would, of course, be constructed of a suitable material adapted to permanently retain its form so as to be capable of re-use for an indefinite period, such for example, as a metal adapted for the purpose.

The webs or side walls of the felly channel are provided with intermediate bracing webs 3ᶜ formed by correspondingly recessed portions 3ᶜ′ in the arc shaped forming portion a which serves to strengthen the structure.

Having thus described our invention, what we claim is:—

1. Apparatus for casting metal wheels having fellies with tire receiving flanges, comprising complementary mold members having mating wheel molding cavities, including a tire receiving flange cavity, a segmental core cooperating with said flange cavity, and a spoke core passing through said core.

2. Apparatus for casting metal wheels having fellies with tire receiving flanges, comprising complementary mold members having mating wheel molding cavities including a tire receiving flange cavity, a segmental core cooperating therewith, and having projections thereon forming a band receiving depression between the tire receiving flanges, and a spoke core passing through said flange core.

3. Apparatus for casting metal wheels having channel-shaped fellies with tire receiving flanges, comprising complementary mold members having mating wheel molding cavities, including felly and tire receiving flange cavities, a segmental core cooperating with the felly and tire receiving flange cavities, and a spoke core passing through said core.

In testimony whereof, we affix our signatures.

HARRY W. KELLER.
ALBERT T. KELLER.